United States Patent
Ichihara

(10) Patent No.: US 10,043,247 B2
(45) Date of Patent: Aug. 7, 2018

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Ko Ichihara, Utsumoniya (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 15/149,340

(22) Filed: May 9, 2016

(65) Prior Publication Data
US 2016/0344952 A1    Nov. 24, 2016

(30) Foreign Application Priority Data

May 19, 2015   (JP) ................................ 2015-101879

(51) Int. Cl.
*G06T 5/00*   (2006.01)
*G06T 5/50*   (2006.01)
*H04N 13/02*  (2006.01)

(52) U.S. Cl.
CPC ............... *G06T 5/003* (2013.01); *G06T 5/50* (2013.01); *H04N 13/0232* (2013.01); *G06T 2207/10012* (2013.01); *G06T 2207/20221* (2013.01)

(58) Field of Classification Search
CPC . G06T 5/003; G06T 5/50; G06T 2207/20221; H04N 13/0232
See application file for complete search history.

(56) References Cited

U.S. PATENT DOCUMENTS

| | | | | |
|---|---|---|---|---|
| 2012/0147205 A1* | 6/2012 | Lescu | .............. | H04N 13/0029 348/218.1 |
| 2012/0314104 A1* | 12/2012 | Nishiyama | ........... | H04N 5/2258 348/241 |
| 2013/0194387 A1 | 8/2013 | Hatakeyama | | |
| 2013/0335596 A1* | 12/2013 | Demandolx | ......... | H04N 5/2354 348/231.99 |
| 2014/0071313 A1* | 3/2014 | Hiasa | ........................ | G06T 5/50 348/231.99 |
| 2015/0288953 A1* | 10/2015 | Kakegawa | ......... | G06K 9/00805 348/43 |

FOREIGN PATENT DOCUMENTS

| | | |
|---|---|---|
| JP | 2013-179564 | 9/2013 |
| JP | 2013-236207 | 11/2013 |

* cited by examiner

*Primary Examiner* — Christopher K Peterson
(74) *Attorney, Agent, or Firm* — Fitzpatrick, Cella, Harper & Scinto

(57) ABSTRACT

An image processing apparatus configured to generate a corrected image in which a deterioration caused by an aberration of an image capturing system is restrained, using a plurality of parallax images mutually having parallaxes generated by the image capturing system. The image processing apparatus includes at least one processor operatively coupled to a memory, serving a: a weight generator configured to generate a plurality of weights as weighting data, each of which corresponds to one of the parallax images, based on one of pixel values and pixel value gradients of pixels at a same position in the plurality of parallax images, and an image generator configured to generate the corrected image by summing up the pixel values at the same position in the plurality of parallax images using the plurality of weights, each of which corresponds to one of the parallax images.

12 Claims, 11 Drawing Sheets

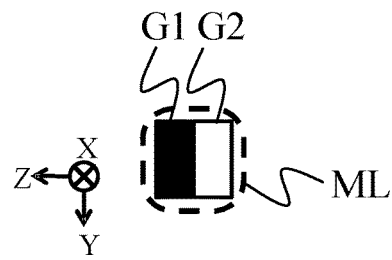 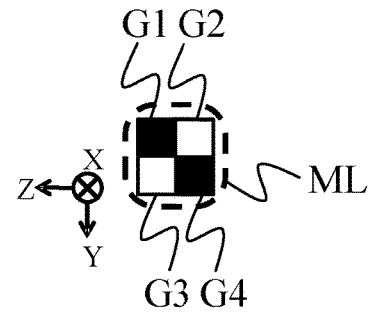
FIG. 4A    FIG. 4C
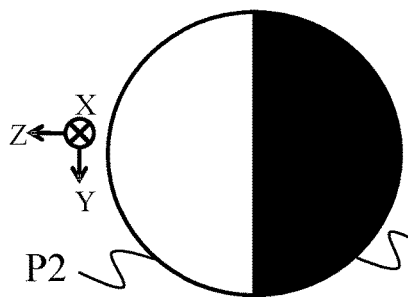 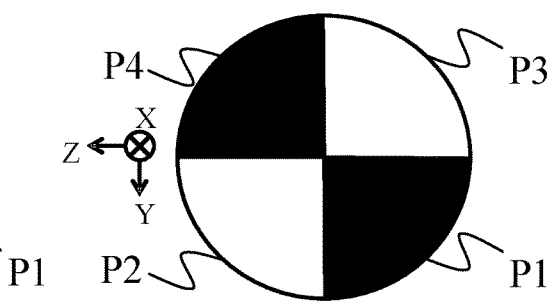
FIG. 4B    FIG. 4D
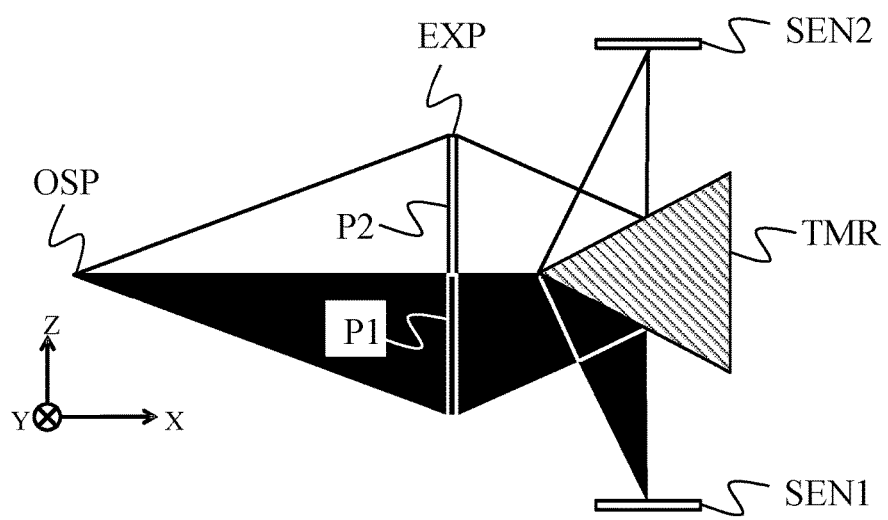
FIG. 5

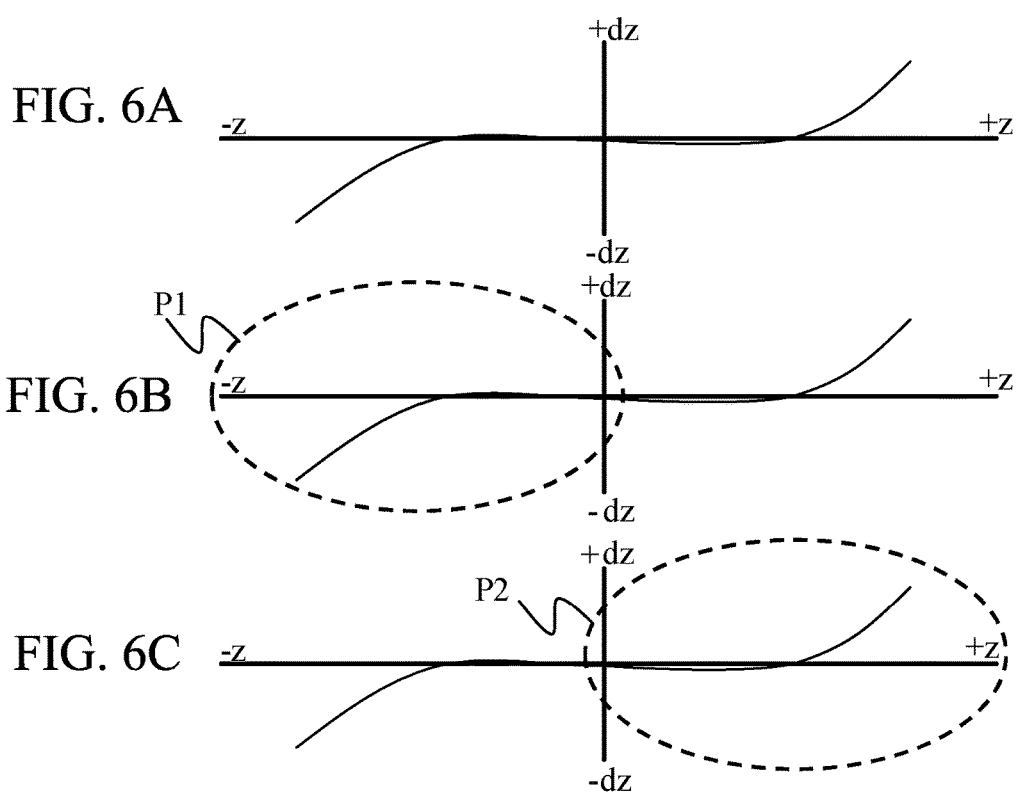

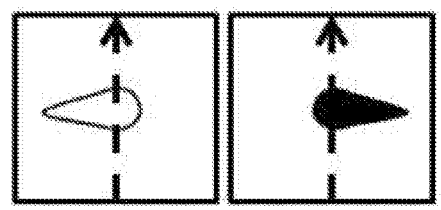
FIG. 12A    FIG. 12B    FIG. 12C
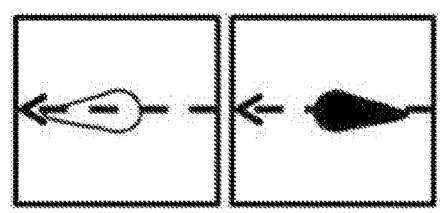
FIG. 13A    FIG. 13B
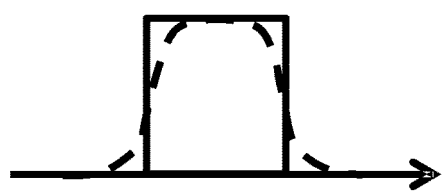
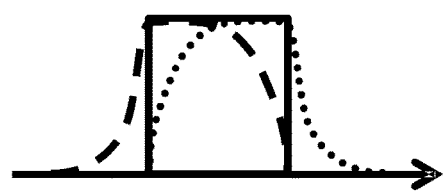
FIG. 13C    FIG. 13D

IMAGE PROCESSING APPARATUS, IMAGE PICKUP APPARATUS, IMAGE PROCESSING METHOD, AND STORAGE MEDIUM

BACKGROUND OF THE INVENTION

Field of the Invention

The present invention relates generally to an image processing technology for improving the quality of an image generated by image pickup, and more particularly to an image processing technology for generating an image in which a deterioration caused by an aberration is restrained using a plurality of parallax images generated by the image pickup.

Description of the Related Art

A captured image generated by an image pickup apparatus, such as a digital camera, has a blur (deteriorated image quality) caused by a micro spread in light emitted from one point under the influence of an aberration, a diffraction, etc. of an image pickup optical system. A point spread function ("PSF") is a function having the micro spread of the light.

It is a known technology to generate a plurality of parallax images having different parallaxes by capturing a plurality of light fluxes that have passed different areas in an exit pupil an image pickup optical system, with different photo-electric converters (pixels or subpixels). However, there is a difference other than the parallax component derived from the different PSF in the plurality of parallax images, since an aberration generally depends on an area in which the light flux passes among the exit pupil.

Japanese Patent Laid-Open No. ("JP") 2013-236207 discloses an image processing method for preparing a filtering function based on the PSF for each of the plurality of parallax images and for correcting a deterioration of each parallax image by performing filtering processing using the filtering function corresponding to each parallax image. JP 2013-179564 discloses an image processing method for reducing ghost (unnecessary light) based on a difference of a plurality of parallax images.

However, the image processing method disclosed in JP 2013-236207 needs plural pieces of PSF data used for and to generate a filtering function by the number of parallax images. Since the PSF changes according to an image pickup condition, such as a focal length and an aperture value of an image pickup optical system, and a position on an image, data are necessary by the number of image pickup conditions and positions. The filtering processing in JP 2013-236207 is convolution processing of a filter (kernel) of a size (dozens taps times dozens taps) larger than a spread of the PSF, and the processing load is heavy. A necessary data amount and processing load increase as the number of parallax images increases. However, it is difficult to correct the deterioration caused by the aberration because pixel value information lacks in an area (pixel value saturated area) in which a pixel value is saturated in a captured image.

The image processing method disclosed in JP 2013-179564 is based on the premise that the pixel value increases by the ghost, and cannot obtain a sufficient deterioration restraining (aberration correcting) effect when the pixel value increases and decreases for each pixel and the aberration occurs.

SUMMARY OF THE INVENTION

The present invention provides an image processing apparatus, for example, that can generate a corrected image in which a deterioration caused by an aberration in a pixel value saturated area is sufficiently restrained even in a pixel value saturated area by burdenless processing with a small data amount based on a plurality of parallax images.

An image processing apparatus according to one aspect of the present invention is configured to generate a corrected image in which a deterioration caused by an aberration of an image capturing system is restrained, using a plurality of parallax images mutually having parallaxes generated by the image capturing system. The image processing apparatus includes a weight generator configured to generate a plurality of weights as weighting data each of which corresponds to one of the parallax images, based on at least one of a pixel value and a pixel value gradient of a corresponding pixel in the plurality of parallax images, and an image generator configured to generate the corrected image using a result of applying each weight to a corresponding one of the plurality of parallax images.

Further features of the present invention will become apparent from the following description of exemplary embodiments with reference to the attached drawings.

BRIEF DESCRIPTION OF THE DRAWINGS

FIGS. 4A to 4D illustrate a relationship viewed from an object point between the exit pupil in the image pickup optical system and the pixels in the image sensor in the image capturing system used for each embodiment.

FIG. 5 is a view illustrating another image capturing system applicable to each embodiment.

FIGS. 6A to 6C are aberrational diagrams illustrating an aberration amount that occurs in the image pickup optical system.

FIGS. 12A to 12C are views illustrating filters used to calculate a pixel value gradient according to the third embodiment.

FIGS. 13A to 13D are views illustrating a relationship between a calculating direction of the pixel value gradient and an aberration correcting effect according to the third embodiment.

DESCRIPTION OF THE EMBODIMENTS

Referring now to the accompanying drawings, a description will be given of embodiments of the present invention.

Further to an explanation of specific first to third embodiments, which will be described later, a description will be given of an image pickup apparatus used to acquire a plurality of parallax images in each embodiment. This image pickup apparatus generates a plurality of parallax images having parallaxes by capturing a plurality of light fluxes that have passed different areas in an exit pupil an image pickup optical system, with different photoelectric converters (pixels or subpixels). The image pickup optical system and the image sensor will be referred to as an image capturing system in the following description.

Figure 2:
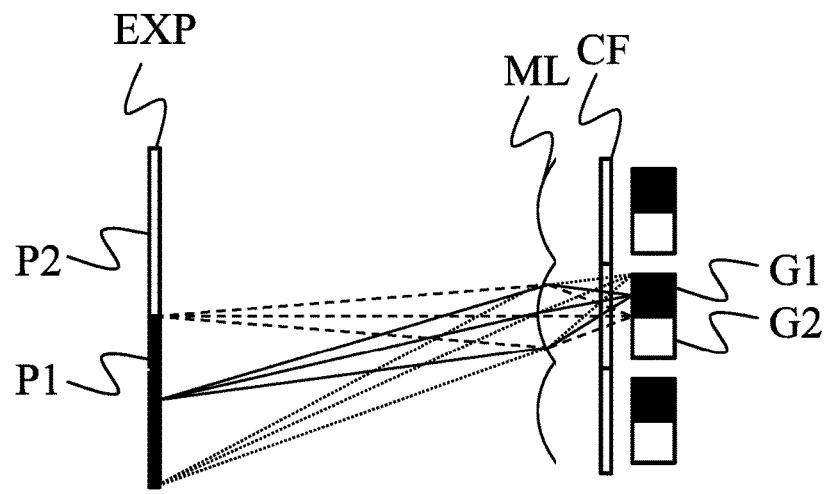
FIG. 2 is a view illustrating a relationship between an exit pupil of an image pickup optical system and a light receiving part of an image sensor in an image capturing system used for each embodiment.

FIG. 2 illustrates a relationship between a pixel in an image sensor and an exit pupil in an image pickup optical system in an image capturing system. In FIG. 2, ML denotes a micro lens, CF denotes a color filter, and EXP denotes the exit pupil in the image pickup optical system. G1, G2 denote subpixels (which will be referred to as G1 and G2 pixels hereinafter), and one G1 pixel and one G2 pixel are paired.

A plurality of pairs of G1 and G2 pixels are arranged in the image sensor. A pair of G1 and G2 pixels is conjugate with the exit pupil EXP via the common micro lens ML (each micro lens ML is provided to each pixel pair). The G1 pixel is conjugate with a P1 area as a pupil area in the exit pupil EXP, and the G2 pixel is conjugate with a P2 area as another pupil area in the exit pupil EXP. A plurality of G1 pixels arranged in the image sensor are referred to as a G1 pixel group, and a plurality of G2 pixels arranged in the image sensor are referred to as a G2 pixel group.

Figure 3:
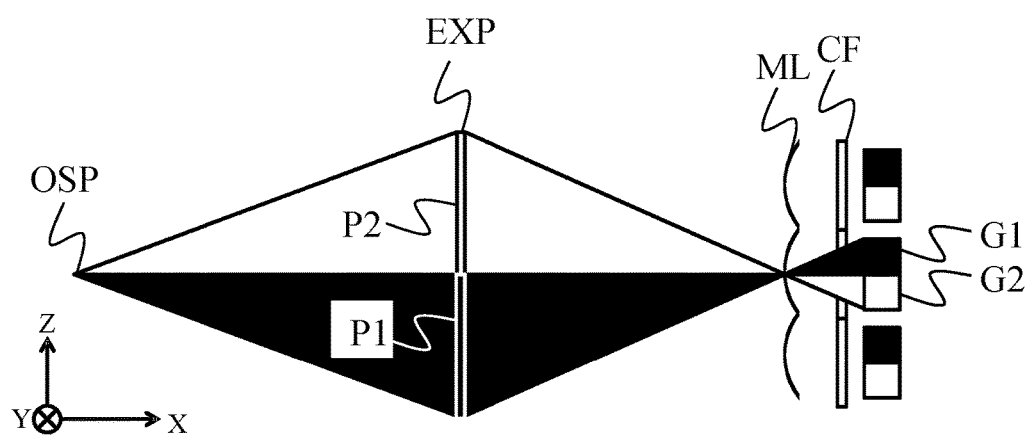
FIG. 3 is a view illustrating the image capturing system.

FIG. 3 schematically illustrates the image capturing system when it is assumed that a thin lens as a virtual lens having no thickness is located at a position of the exit pupil EXP. The G1 pixel receives a light flux that has passed the P1 area in the exit pupil EXP, and the G2 pixel receives a light flux that has passed the P2 area in the exit pupil EXP. ML is a micro lens illustrated in FIG. 2, and CF is a color filter similarly. An X direction is an optical axis direction of the image pickup optical system. Y and Z directions are orthogonal to each other and to the X direction.

OSP is an object point to be captured. A light flux from the object point is guided to G1 and G2 pixels according to an area (position) in which the light flux passes in the exit pupil EXP. In other words, the light fluxes passing in the areas different from each other in the exit pupil means the light flux from the object point OSP being separated into a plural light fluxes according to angles (parallaxes). Hence, an image generated based on an output signal from the G1 pixel group on the image sensor and an image generated based on an output signal from the G2 pixel group on the image sensor are a plurality of (herein a pair of) parallax images having parallaxes that are different from each other.

In the following description, a pupil division means that a plurality of light fluxes different from one another that have passed different pupil areas in the exit pupil EXP are guided to pixels that are different from each other.

FIG. 4A illustrates the micro lens ML and the pair of G1 and G2 pixels illustrated in FIG. 3 along the optical axis (X direction) of the image capturing system viewed from the object point OSP side. FIG. 4A omits the color filter CF illustrated in FIG. 3. FIG. 4B illustrates the P1 and P2 areas in the exit pupil EXP corresponding to the G1 and G2 pixels illustrated in FIG. 4A. The image capturing system illustrated in FIGS. 4A and 4B obtain a pair of parallax images, as described above.

FIG. 4C illustrates G1, G2, G3, and G4 pixels in one micro lens ML viewed from the object point side along the optical axis direction (X direction). FIG. 4C omits the color filter CF. The G1, G2, G3, and G4 pixels are conjugate with P1, P2, P3, and P4 areas that are different from one another in the pupil areas in the exit pupil EXP illustrated in FIG. 4D via the common micro lens ML. The light flux from the object point OSP is guided to the G1, G2, G3, and G4 pixels according to the passing area among the P1, P2, P3, and P4 in the exit pupil EXP. Thereby, four images generated based on the output signals from the G1, G2, G3, and G4 pixel groups on the image sensor form four parallax images mutually having parallaxes.

In the image capturing system according to each embodiment, the above conjugate relationship may be slightly destroyed, for example, due to a positional shift of the exit pixel EXP. In the image capturing system according to each embodiment, the plurality of pupil areas illustrated in FIGS. 4B and 4D may partially overlap each other, and there may be an interval among the areas.

The image sensor may thus include two or four photoelectric converters for one micro lens as described above, or may include more photoelectric converters (via the micro lens conjugate with the exit pupil).

The above image capturing system is merely illustrative, and is not limited as long as it can provide the pupil division. For example, as illustrated in FIG. 5, a pair of light fluxes that have passed the P1 and P2 areas in the exit pupil EXP may be led to different image sensors or photoelectric converters SEN1 and SEN2 in the image capturing system via a triangular mirror TMR. This image capturing system can generate a pair of parallax images by separately reading the output signals out of the photoelectric converters SEN1 and SEN2.

Referring now to FIGS. 1A to 1F, 6A to 6C, and 8A to 8E, a description will be given of a principle of an image processing method (simply referred to as "image processing" hereinafter) for generating a corrected image in which the image quality is deteriorated caused by an aberration is restrained, using a plurality of parallax images generated by the above image capturing system.

In general, in the image pickup optical system, the aberration is different according to an area in the exit pupil in which the light flux passes. Each embodiment generates, based on this difference, a corrected image in which the deterioration caused by the aberration of the image pickup optical system is restrained. The following description uses a pair of parallax images obtained in the image capturing system illustrated in FIG. 3.

Figure 1A:
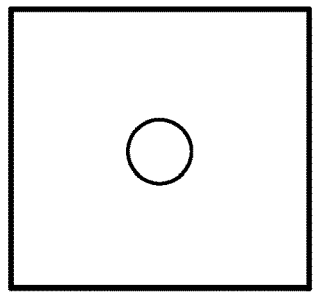
FIGS. 1A to 1F are views for explaining a principle of an image processing method according to each embodiment of the present invention.

FIG. 1A illustrates an image obtained by capturing an object using an ideal image capturing system that has no aberration that would otherwise deteriorate the image. The following description refers to an image obtained by the ideal image capturing system as an ideal image. The aberration can occur in a micro lens in the image sensor as well as the image pickup optical system, and the aberration of the entire image capturing system needs to be actually considered but the following description addresses the aberration that occurs in the image pickup optical system.

Figure 1B:
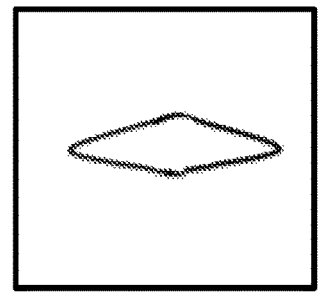

FIG. 6A is a lateral aberration diagram illustrating an illustrative aberration that can occur in the image pickup optical system or an aberration amount distribution on the exit pupil. In this lateral aberration diagram, the horizontal axis denotes a position in the Z direction in FIG. 3, and the vertical axis denotes a Z component of the lateral aberration amount. An image illustrated in FIG. 1B is obtained by capturing an object without a pupil division through the image pickup optical system having the aberration illustrated in FIG. 6A.

The P1 and P2 areas in the exit pupil EXP illustrated in FIG. 4B corresponds to areas illustrated by broken lines in FIGS. 6B and 6C each of which illustrates the same aberration as that of FIG. 6A. It is understood from these figures that a generated aberration is different between the P1 and P2 areas. A difference between the pair of parallax images due to the aberrational difference with the difference of the area in the exit pupil which the light flux passes. The aberrations illustrated in FIGS. 6A to 6C are mere illustrative, and the image pickup optical system does not always require this aberration as long as an aberration amount changes due to a light passing area in the exit pupil in the image pickup optical system.

Figure 1C:
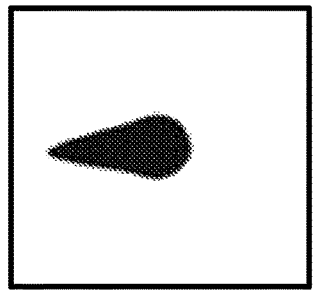
Figure 1D:
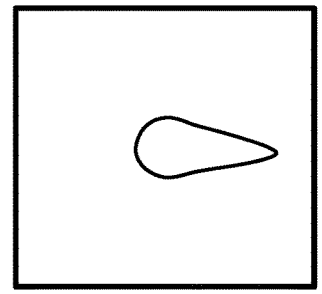

FIGS. 1C and 1D illustrate one and the other of the pair of parallax images obtained by image pickup through the pupil division. These figures illustrate the one parallax image in black and the other parallax image in white for better discriminations but these images actually have the same colors.

Figure 1E:
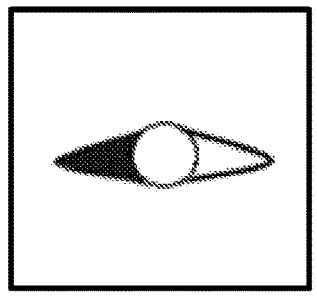
Figure 1F:
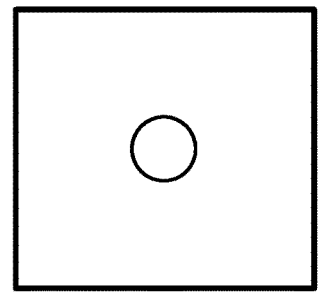

FIG. 1E illustrates a difference between the one parallax image and the other parallax image illustrated in FIGS. 1C and 1D. This difference illustrates an aberrational component that occurs in the image pickup optical system which is contained in the one and the other parallax images. Therefore, image processing based on this difference can generate a corrected image illustrated in FIG. 1F in which the deterioration caused by the aberration is restrained. Specific image processing will be described later in the first embodiment.

Figure 7A:
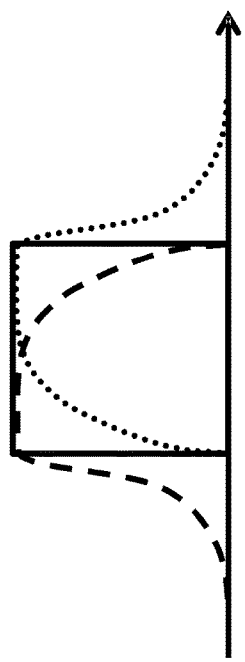
FIGS. 7A to 7F are views illustrating a one-dimensional distribution of a plurality of images illustrated in FIGS. 1A to 1F.
Figure 7C:
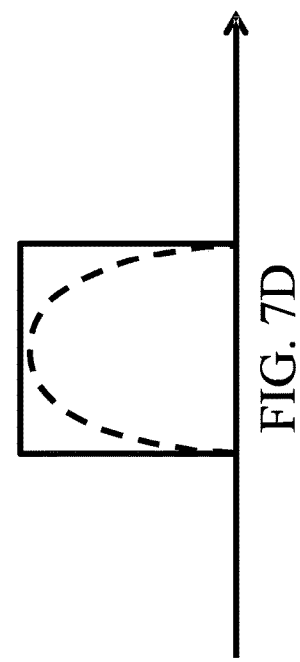
Figure 7B:
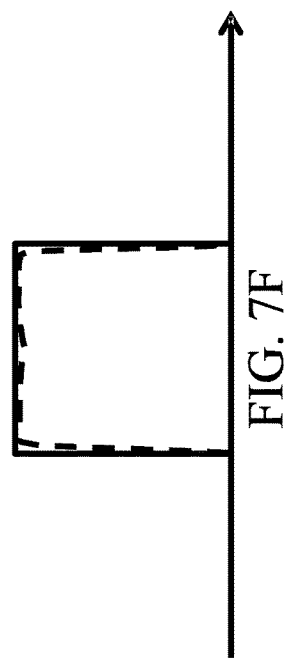

Each of FIGS. 7B and 7C illustrates a one-dimensional pixel value distribution on a line along a broken arrow illustrated in FIG. 7A in the image illustrated in FIGS. 1A, 1C, 1D, and 1F. The solid line in FIGS. 7B and 7C illustrate a pixel value distribution of the ideal image. Broken and solid lines in FIG. 7B illustrate pixel value distributions of the one and other pixel images, and a broken line in FIG. 7C illustrates a pixel value distribution of the corrected image.

While this embodiment illustratively describes the principal of the image processing that generates a corrected image using a difference between the pair of parallax images, a corrected image may be generated based on the difference among more parallax images and a method other than the method using the difference between parallax images may be employed.

The following first embodiment describes image processing for performing a correction or restraining the deterioration caused by the aberration using a weight as plural (a pair of) pieces of weight data (referred to as a "correcting weight" hereinafter) corresponding to the difference of the pixel value between a plurality of (a pair of) parallax images. The second embodiment describes image processing for correcting the aberration using a pair of correcting weights corresponding to a difference of the pixel value between a pair of parallax images (which is different from the difference in the first embodiment). The third embodiment describes image processing for correcting the aberration using the plurality of correcting weights corresponding to the difference of the pixel value and the difference of the pixel value gradient.

Figure 8A:
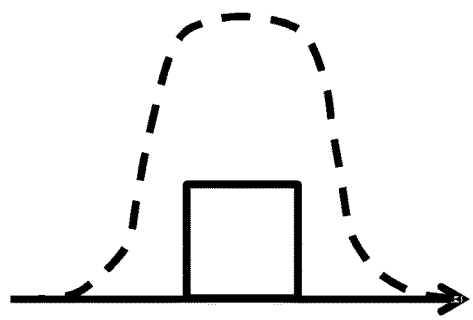
FIGS. 8A to 8E are views for explaining an aberrational correction in a pixel saturated area according to each embodiment.

The image processing according to each embodiment is characterized in correcting the aberration even in a pixel value saturated area. A pixel value that can be output from each pixel has an upper limit (saturated pixel value) in an image output from the image sensor, and a pixel value higher than the upper limit cannot be output. In FIGS. 8A to 8E, a solid line illustrates a one-dimensional pixel value distribution of an ideal image obtained by image pickup when an incident light quantity is restrained on the image sensor so that the pixel value does not saturate. On the other hand, a broken line in FIG. 8A illustrates a pixel value distribution of the image obtained by image pickup without a pupil division when the pixel value of the image sensor does not have an upper limit (or does not saturate).

Figure 8B:
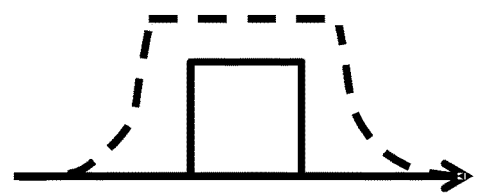

A broken line in FIG. 8B illustrates a one-dimensional distribution of a saturated pixel value in an image obtained by image pickup without a pupil division when an incident light amount on the image sensor is large. Since the pixel value of the image sensor actually thus has an upper limit, the pixel value equal to or higher than the upper limit becomes a saturated pixel value having a constant value. In other words, the original pixel values lack. Since an aberration component does not correctly appear in an area (referred to as a "pixel value saturated area" hereinafter) that contains a saturated pixel in which a pixel value lacks, the conventional image processing method disclosed in JP 2013-236207 has difficulties in correcting the aberration.

Figure 8C:
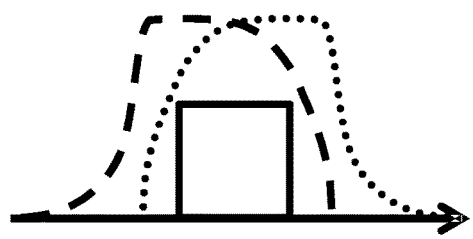
Figure 8D:
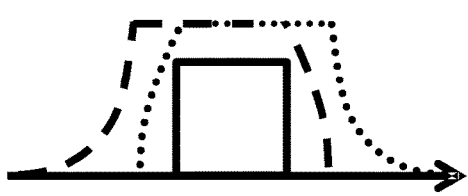
Figure 8E:
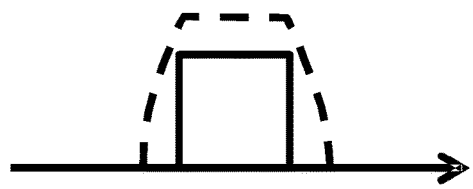

The broken and dotted lines in FIG. 8C illustrate pixel value distributions of a pair of parallax images obtained by image pickup with a pupil division when the pixel value of the image sensor has no upper limit. Since the image pickup with the pupil division has an upper limit in the pixel value of the image sensor, and pixel values equal to or higher than the upper limit lack in the actually obtained pixel values in the pair of parallax images as illustrated by broken and dotted lines in FIG. 8D. However, even when the pixel value lacks in the pixel value saturated area, the pair of parallax image have different pixel values as illustrated in FIG. 8D. Thus, the image processing based on the difference of the pixel value gradient or the pixel value between the pair of parallax images according to each embodiment can generate an image in which the deterioration caused by the aberration is restrained even in the pixel value saturated area in which the pixel value lacks as illustrated by a broken line in FIG. 8E.

The "pixel value" used for the above and following embodiments may be a pixel value of each RGB color channel that constitutes a color image or a luminous value.

First Embodiment

The first embodiment describes image processing using a pair of correcting weights set (generated) based on a difference between a pair of parallax images. A description will now be given of the image pickup apparatus mounted with the image processing apparatus that executes the image processing.

Figure 9:
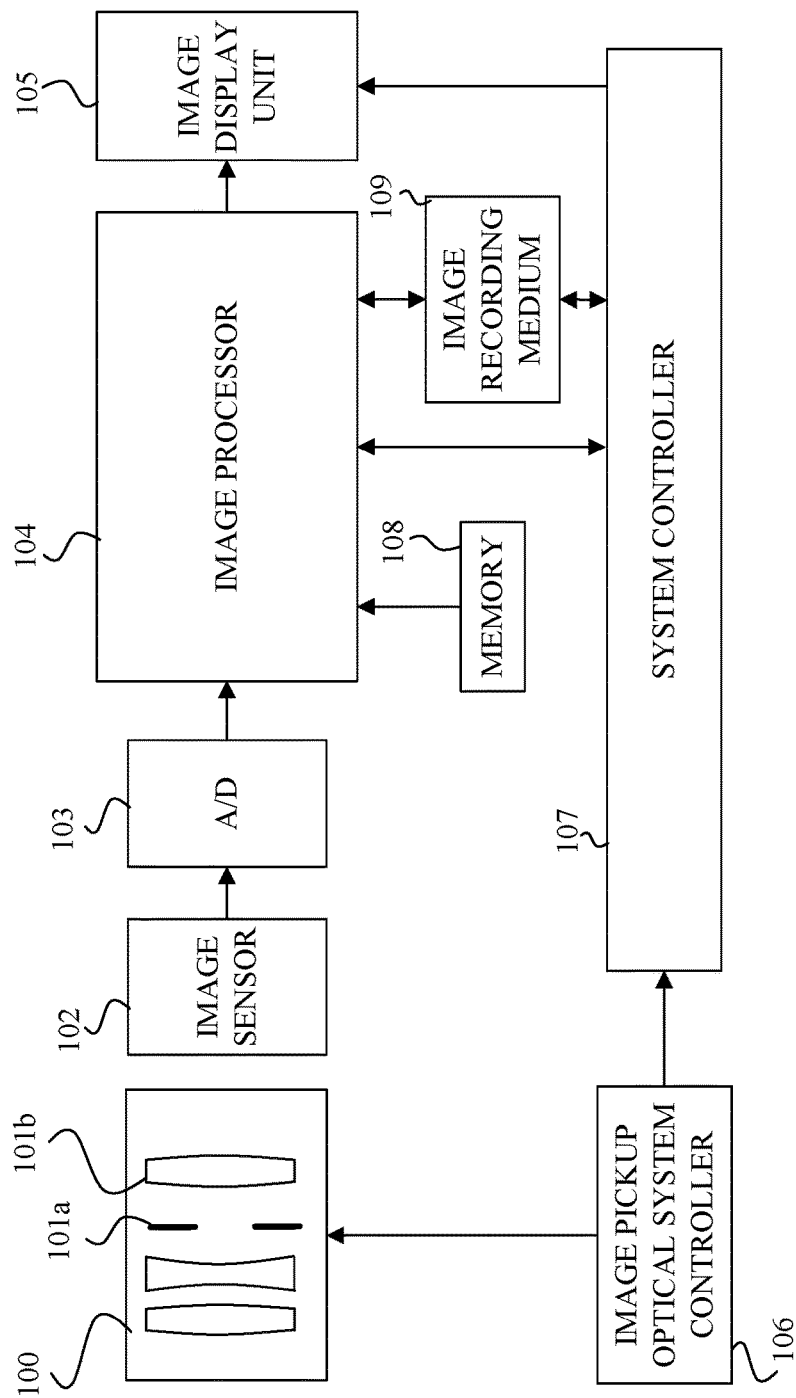
FIG. 9 is a block diagram illustrating a structure of an image pickup apparatus according to first, second, and third embodiments.

FIG. 9 illustrates a structure of the image pickup apparatus. An image pickup optical system 100 forms an image on an image sensor 102 using light from an object (not illustrated). The image sensor 102 includes a photoelectric converter, such as a CMOS sensor and a CCD sensor. The image sensor 102 includes, as illustrated in FIG. 2, a plurality of micro lenses ML and G1 and G2 pixels that serve as one pair of photoelectric converts (subpixels) for one micro lens ML. The image sensor 102 provides image pickup with a pupil division by photoelectrically converting a pair of light fluxes (object images) that have passed pupil areas P1, P2 that are different from each other in the exit pupil EXP in FIG. 2 in the image pickup optical system 100, using the G1 and G2 pixels corresponding to the respective pupil areas. The image pickup optical system 100 and the image sensor 102 constitute an image capturing system.

A captured signal (analog signal) generated by photoelectrical conversions in the G1 and G2 pixel groups on the image sensor 102 is converted into a digital captured signal by an A/D converter 103, and input into an image processor 104 that serves as an image processing apparatus.

The image processor 104 generates an input image by performing various processing for the digital captured signal, and generates a pair of parallax images by separating (reconstructing) the input image into an image corresponding to the G1 pixel group and an image corresponding to the G2 pixel group. The image processor 104 that also serves as a weight generator and an image generator calculates a difference between a pair of parallax images, and generates a pair of correcting weights that are applicable to the pair of parallax images according to the difference. The image processor 104 generates a single corrected image using a result (a pair of weighted images) of applying the correcting weights corresponding to the pair of parallax images.

The corrected image generated by the image processor 104 is recorded in an image recording medium 109, such as a semiconductor memory and an optical disc. The corrected image is displayed on an image display unit 105.

A system controller 107 controls driving of the image sensor 102 and processing in the image processor 104. An image pickup optical system controller 106 controls driving of a diaphragm 101a and a focus lens 101b included in the image pickup optical system 100, in accordance with a control signal from the system controller 107. The diaphragm 101a changes its aperture diameter according to a set aperture value (F-number) and adjusts a light quantity incident on the image sensor 102. The focus lens 101b provides focusing when an unillustrated AF system and manual focus mechanism change the position of the focus lens 101b. The image pickup optical system 100 is part of the image pickup apparatus in FIG. 9 but may be an interchangeable image pickup optical system as in a single-lens reflex camera.

Figure 10:
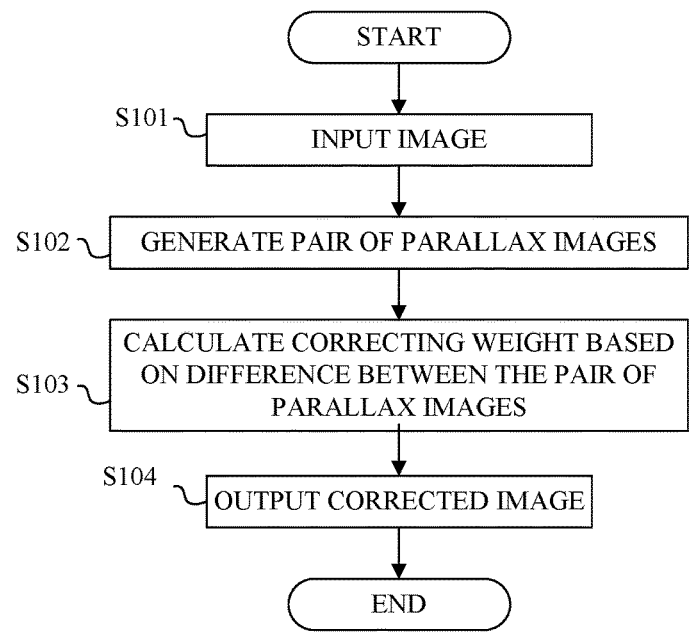
FIG. 10 is a flowchart illustrating a procedure of image processing according to the first embodiment.

Referring now to a flowchart in FIG. 10, a description will be given of a concrete procedure of image processing according to this embodiment. The image processor 104 as an image processing computer executes image processing in accordance with an image processing program as a computer program under command of the system controller 107. A correction processor (image processing apparatus) configured to execute the following image processing may be provided separate from the image processor 104. The image processing program and the other correction processor are also applied to the other embodiments.

In step S101, the image processor 104 takes the captured signal via the A/D converter 103 from the image sensor 102 that has captured the object under control of the system controller 107, and generates the input image from the captured signal.

In step S102, the image processor 104 generates a pair of parallax images by reconstructing the input image.

In step S103, the image processor 104 calculates the difference between the pair of parallax images, and sets (generates) the pair of correcting weights based on the difference. Specific processing will be described later. IMG1 and IMG2 denote a pair of parallax images, and corresponding pixels mean pixels (having the same pixel addresses) that correspond to each other between the pair of parallax images IMG1 and IMG2. A pair of correcting weights applied to the pair of parallax images IMG1 and IMG2 will be referred to as W1 and W2. Each correcting weight has two-dimensional arrangement data with the same number of elements as the pixel number in each parallax image.

The image processor 104 initially calculates a difference of a pixel value between the corresponding pixels in IMG1 and IMG2 by subtracting a pixel value of IMG2 from a pixel value of IMG1 for each corresponding pixel. Next, the image processor 104 sets the correcting weight values to W1=0 and W2=1 for the corresponding pixels in which the calculated difference has a positive value, and to W1=1 and W2=0 for the corresponding pixels in which the calculated difference has a negative value. The image processor 104 sets the correcting weight values to arbitrary positive values such that W1+W2=1 for the corresponding pixels in which the difference is zero.

In step S104, the image processor 104 generates and outputs a corrected image R as expressed in Expression (1) by adding a pair of weighted images to each other or a multiplication result of the pair of parallax images IMG1 and IMG2 by the corresponding correcting weights W1 and S2.

Expression 1

$$R(i,j)=IMG1(i,j)\times W1(i,j)+IMG2(i,j)\times W2(i,j) \qquad (1)$$

In Expression (1), (i, j) denotes a pixel address in each parallax image, IMG1($i$, $j$) and IMG2($i$, $j$) denote pixel values at the pixel address (i, j) (corresponding pixel). W1($i$, $j$) and W2($i$, $j$) denote element values of the correcting weights corresponding to the pixel address (i, j).

The image processor 104 may generate the corrected image R using the correcting weight calculated only in a partial image area (which is a corresponding image area that contains a plurality of pixels having the same pixel addresses in the pair of parallax images) arbitrarily selected by a user of the image pickup apparatus. The image processor 104 may output as the corrected image R an image having a pixel value that is made averaging the pixel values in other corresponding areas in the pair of parallax images. In other words, the user may correct the aberration only in the arbitrarily selected, corresponding image area.

The corrected image output from the image processor 104 is stored in the image memory 109 under command of the system controller 107. In this case, the system controller 107 may store at least one of the input image and the pair of parallax images before the aberration is corrected, in the image recording medium 109. The system controller 107 may make the image display unit 105 display at least one of the corrected image, the input image, and the pair of parallax images before the aberration is corrected.

While the image processor 104 generates the pair of parallax images by reconstructing the input image in the steps S102 to S104 and then corrects the aberration, the aberration may be corrected by acquiring the pair of parallax images without reconstructing the input image. This is true of the other embodiments, which will be described later.

The image processing according to this embodiment can generate the corrected image in which the deterioration caused by the aberration is well restrained as illustrated by the broken line in FIG. 7C, using the pair of parallax images illustrated by the broken and dotted lines in FIG. 7B.

The image processing according to this embodiment can calculate the pair of correcting weights based on the difference between the pixel values of the pair of parallax images, and generates the corrected image only by adding the multiplication result of the pair of parallax images by the corresponding correcting weights. Unlike the filtering processing disclosed in JP 2013-236207, it is unnecessary to use a different filter for each position on the image and for each image pickup condition or to provide burdensome processing such as a convolution using this filter. This embodiment can thus generate a corrected image by fast image processing with a small data amount. In addition, the aberration can be corrected even in the pixel value saturated area.

Second Embodiment

The second embodiment describes a variation of the image processing according to the first embodiment. The structure of the image pickup apparatus that includes the image processing apparatus (image processor 104) configured to execute the image processing according to the second embodiment is the same as that of the first embodiment in FIG. 9, and a description thereof will be omitted.

The image processing according to the first embodiment sets the pair of correcting weights based on the difference between the pixel values in the corresponding pixels in the pair of parallax images. On the other hand, the image processing according to this embodiment calculates (generates) a pair of correcting weights based on the reciprocals of the pixel values of the corresponding pixels in the pair of parallax images. More specifically, this embodiment calculates the pair of correcting weights W1 and W2 using Expression (2):

Expression 2

$$W_\alpha(i, j) = \frac{1}{\Sigma_\beta \left(\frac{1}{IMG_\beta(i, j)}\right)^g} \left(\frac{1}{IMG_\alpha(i, j)}\right)^g \quad (2)$$

In Expression (2), α and β are subscripts representing individual parallax images, and are integers in a range from 1 to 2 in this embodiment. (i, j) represents a pixel address in each parallax image. IMG(i, j) represents a pixel value at the pixel address (i, j) (corresponding pixel) in each parallax image, and W(i, j) represents an element value of the correcting weight corresponding to the pixel address (i, j). In addition, g represents a parameter used to control an aberration correcting effect, and the user can arbitrarily set the value of g. Each correcting weight has two-dimensional arrangement data with the same number of elements as the pixel number of the corresponding parallax image.

The pixel value for each pixel in each parallax image is higher or lower than that in the ideal image due to the deterioration caused by the aberration. Since the aberrations that occur in the pair of parallax images are different as described above, the increase and decrease of the pixel value caused by the aberration are also different between the parallax images. In Expression (2), a sum of corresponding elements of the pair of correcting weights to be applied to the corresponding pixels in the pair of parallax images is normalized to 1. This means that the reciprocal of the pixel value is compared for each corresponding pixel in the pair of parallax images, and a correcting weight corresponding to the parallax image having a lower pixel value is made larger. By normalizing the pair of correcting weights and by calculating one of the correcting weights, the other correcting weight is automatically determined (calculated). The plurality of correcting weights are generated even when the other of the plurality of correcting weights is automatically determined by the normalization and by calculating one correcting weight.

Assume that IMG1 and IMG2 represent a pair of parallax images. Then, this embodiment also expresses the corrected image R as a sum of IMG1×W1 and IMG2×W2 in Expression (1). The image processing according to this embodiment can generate the corrected image in which the deterioration caused by the aberration is sufficiently restrained as illustrated by the broken line in FIG. 7D using the pair of parallax images illustrated by the broken and dotted lines in FIG. 7B.

The reciprocal of the pixel value illustrated in Expression (2) abruptly changes in an image area having low pixel values, and mildly changes in an image area having high pixel values. Hence, the correcting weights are significantly different in the image area having low pixel values even if there is a slight discordance between the pixel values in the pair of parallax images. On the other hand, the correcting weights are not significantly different in the image area having high pixel values even if there is a large discordance between the pixel values in a pair of parallax images. In other words, the image processing according to this embodiment provides a stronger aberration correcting effect in the image area having low pixel values than in the image area having high pixel values.

The parameter g used to control the aberration correcting effect in Expression (2) is an index of a reciprocal of a pixel value. The dependency of the correcting weight on the reciprocal of the pixel value improves by increasing the parameter g. The parameter g has a positive value and is typically set to a value of about g=1 to 10.

When the parameter g is set to an extremely large value, such as g=∞, the correcting weight can be binarized such as one correcting weight of 1 corresponding to a parallax image having a lower pixel value and the other correcting weight of 0 corresponding to a parallax image having a higher pixel value in the pair of parallax images. The corrected image generated at this time is the same as the corrected image generated by the processing using the correcting weight generated based on the difference between the pixel values according to the first embodiment.

Figure 7D:
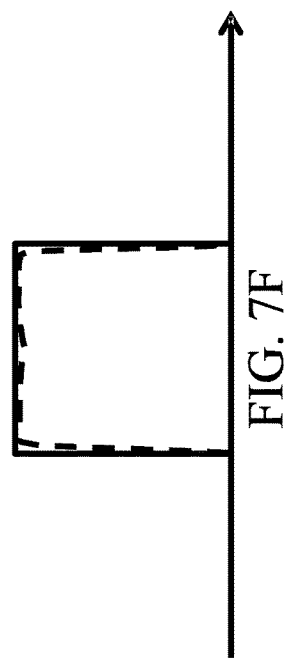

As described above, the image processing according to this embodiment provides a stronger effect in the image area having low pixel values than in the image area having high pixel values, and this is particularly remarkable when the parameter g is small. When the parameter g is set to a value as small as about 1, the correcting weight is not binarized and thus the pixel value of the parallax image having a lower pixel value in the pair of parallax images is not employed as a pixel value of the corrected image. In other words, in an image area having a high pixel value, the pixel value of the corrected image is set to a pixel value that is slightly higher than the pixel value of the parallax image having a lower pixel value in the pair of parallax images. Thereby, the image processing according to this embodiment can generate a corrected image closer to a corrected image having increased pixel values in the image area having high pixel values as illustrated in FIG. 7D or the ideal image than the corrected image generated by the image processing according to the first embodiment illustrated in FIG. 7C.

Figure 11:
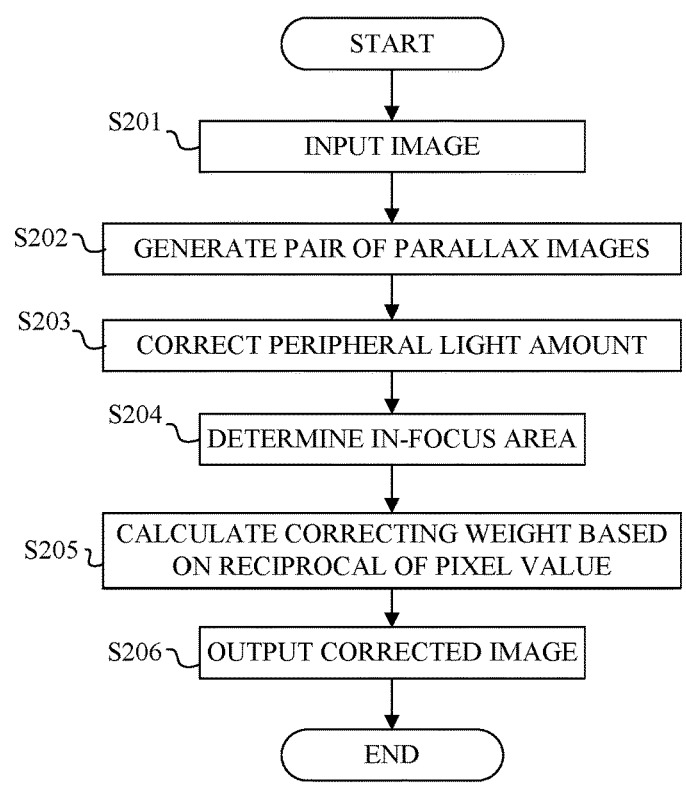
FIG. 11 is a flowchart illustrating a procedure of image processing according to the second embodiment.

Referring now to a flowchart in FIG. 11, a description will be given of a concrete procedure of the image processing according to this embodiment. Steps S201 and S202 are the same as S101 and S102 according to the first embodiment in FIG. 10, and a description thereof will be omitted.

In step S203, the image processor 104 that serves as a peripheral light quantity corrector provides a correction for reducing a difference of a vignetting amount for each of the pair of parallax images. Similar to the difference of the aberration, the vignetting amount is different between the pair of parallax images, and the subsequent aberration correcting effect can be improved by the correction for reducing or eliminating the difference of the vignetting amount. More specifically, the image processor 104 reads out of the memory 108 information of the vignetting amount for each pixel in the image capturing system stored in the memory 108. Then, the image processor 104 generates the pair of light quantity corrected parallax images by using the read information of the vignetting amount and by correcting the pixel values of at least one of the parallax images so that the pair of parallax images have the same vignetting amounts.

In step S204, the image processor 104 detects an in-focus area in which the image pickup optical system 100 is focused based on a parallax amount between the pair of light quantity corrected parallax images (or pair of parallax images before the difference of the vignetting amount is corrected). More specifically, the image processor 104 calculates a defocus amount of the image pickup optical system 100 to the object based on the parallax amount obtained between the corresponding pixels, and detects as the in-focus area the image area that contains the corresponding pixels in which the defocus amount falls in an in-focus range. In addition, the in-focus area may be detected based on the information of the defocus amount obtained by an unillustrated distance measuring apparatus.

In step S205, the image processor 104 calculates (generates) the pair of correcting weights W1 and W2 using Expression (2) in the in-focus area detected in the step S204 in the pair of light quantity corrected parallax images IMG1 and IMG2. The parameter g is set, for example, as g=2. W1 is calculated from Expression (3) and W2 is calculated from Expression (4).

Expression 3

$$W1(i, j) = \frac{1}{\left(\frac{1}{IMG1(i, j)}\right)^2 + \left(\frac{1}{IMG2(i, j)}\right)^2} \left(\frac{1}{IMG1(i, j)}\right)^2 \quad (3)$$

Expression 4

$$W2(i, j) = \frac{1}{\left(\frac{1}{IMG1(i, j)}\right)^2 + \left(\frac{1}{IMG2(i, j)}\right)^2} \left(\frac{1}{IMG2(i, j)}\right)^2 \quad (4)$$

In step S206, the image processor 104 applies the pair of correcting weights W1 and W2 calculated in the step S205 as in Expression (1) to the pixel value of the in-focus area of the pair of light quantity corrected parallax images IMG1 and IMG2, and outputs the corrected image R. Outside the in-focus range, the image processor 104 outputs an average value of the pixel values of the pair of light quantity corrected parallax images for each pixel as a pixel value of the corrected image R. This embodiment thus corrects the aberration only in the in-focus area.

The corrected image output from the image processor 104 is stored in the image recording medium 109 under command of the system controller 107. The system controller 107 may store at least one of the pair of parallax images before the aberration is corrected, the pair of light quantity corrected parallax images, and input image, in the image recording medium 109. The system controller 107 may make image display unit 105 display at least one of the corrected image, the pair of parallax images before the aberration is corrected, the pair of light quantity corrected parallax images, and input image.

The image processing according to this embodiment can calculate the pair of correcting weights by simple four basic operations of arithmetic using the pixel values in the pair of parallax images, and can obtain a corrected image only by an addition of the pixel values of the multiplication result of the pair of parallax images by the correcting weights. Unlike the filtering processing disclosed in JP 2013-236207, it is unnecessary to use a different filter for each position on the image and for each image pickup condition or to provide burdensome processing such as a convolution using this filter. Therefore, the corrected image can be generated by fast image processing with a small data amount.

Third Embodiment

The third embodiment describes a variation of the image processing according to the second embodiment. The basic structure of the image pickup apparatus that includes the image processing apparatus (image processor 104) configured to execute the image processing according to this embodiment is the same as that of the first embodiment in FIG. 9, and a description thereof will be omitted. The image sensor 102 used for this embodiment has four subpixels G1, G2, G3, and G4 pixels for one micro lens ML, as illustrated in FIG. 4C.

The image processing according to the second embodiment calculates the pair of correcting weights based on the pixel value of the corresponding pixel between the pair of parallax images. On the other hand, the image processing according to this embodiment calculates (generates) a plurality of (four) correcting weights based on the pixel value and the pixel value gradient of the corresponding pixel between the plurality of (four) parallax images.

An outline will be given of the image processing (aberration correction) as a characteristic of this embodiment using the correcting weight calculated based on the pixel value gradient and the pixel value of the corresponding pixel between the plurality of parallax images. In this outline, a single corrected image is generated based on two (a pair of) parallax images for better understandings.

Since the pixel value of the corresponding pixel is different between the parallax images due to the deterioration caused by the aberration, the pixel value gradient is also different. Broken and dotted lines in FIG. 7E represent a one-dimensional pixel value distribution illustrated by the broken and dotted lines in FIG. 7B or absolute values of the pixel value gradients (differential amounts) in the pixel value distribution.

Figure 7E:
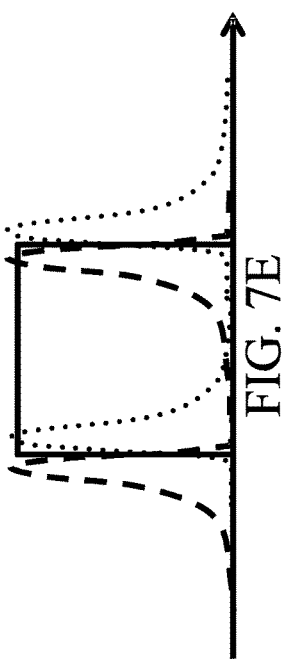

As illustrated in FIGS. 7B and 7E, a local image area in each parallax image in which a pixel value gradient is small or a pixel value distribution is smooth is close to the ideal image. In the actual image pickup, the ideal image is unknown and its information is unavailable, but a pseudo pixel value that is less affected by the aberration can be selected for each local image area in each parallax image by using the pixel value gradient to calculate the correcting weight.

More specifically, the pair of correcting weights is calculated using Expression (5).

Expression 5

$$W_\alpha(i, j) = \frac{1}{\Sigma_\beta \left( \frac{1}{IMG_\beta(i, j) \cdot |\Delta IMG_\beta(i, j)|^{g1}} \right)^{g2}} \left( \frac{1}{IMG_\alpha(i, j) \cdot |\Delta IMG_\alpha(i, j)|^{g1}} \right)^{g2} \quad (5)$$

In Expression (5), $\alpha$ and $\beta$ are subscripts representing individual parallax images, and are integers in a range from 1 to 2 in this embodiment, although $\alpha$ and $\beta$ are integers in a range from 1 to 4 for four parallax images. (i, j) represents a pixel address in each parallax image. IMG(i, j) represents a pixel value at the pixel address (i, j) (corresponding pixel) in each parallax image. In addition, each of g1 and g2 represents parameters used to control an aberration correcting effect, and the user can arbitrarily set the value. $\Delta$IMG(i, j) represents a pixel value gradient at the pixel address (i, j) in each parallax image. Each correcting weight has two-dimensional arrangement data with the same number of elements as the pixel number of the corresponding parallax image.

The pixel value gradient $\Delta$IMG is calculated by convoluting a differential filter having a directional 1×3 tap with a parallax image, as illustrated in FIG. 12A. An alternative filter as a filter that is less affected by noises on the image may be a Prewitt filter having a 3×3 tap illustrated in FIG. 12B or a Sobel filter having a 3×3 tap illustrated in FIG. 12C. Any means may be used as long as it can calculate the pixel value gradient. While a processing speed increases as the filter size (tap number) reduces, an arbitrary size may be used according to purposes.

The correcting weight expressed in Expression (5) is made by adding a reciprocal of the pixel value gradient to a correcting weight calculated with the reciprocal of the pixel value and Expression (2) in the second embodiment. As described above, the reciprocal of the pixel value greatly affects the correcting weight in the image area having low pixel values whereas the influence of the reciprocal of the pixel value gradient on the correcting weight does not change due to the pixel value. Therefore, the correcting weight expressed in Expression (5) reflects an effect of the reciprocal of the pixel value stronger than the pixel value gradient in the image area having low pixel values and an effect of the pixel value gradient stronger than the reciprocal of the pixel value in the image area having high pixel values.

Now assume that a first weight component is a weight component corresponding to the pixel value in the correcting weight, and a second weight component is a weight component corresponding to the pixel value gradient. Then, the correcting weight is generated such that the first weight component is heavier than the second weight component in the image area having low pixel values in each parallax image, and the second weight component is heavier than the first weight component in the image area having high pixel values.

Expression (5) normalizes to 1 a sum of the corresponding elements in the pair of correcting weights to be applied to the corresponding pixels in the pair of parallax images. This means that the discordances of the pixel value and the pixel value gradient are compared for each corresponding pixel in the pair of parallax images, and a correcting weight corresponding to a parallax image having a small pixel value and a small pixel value gradient is made larger. Similar to Expression (2), the other correcting weight is automatically determined (calculated) in Expression (5) by normalizing the pair of correcting weights and by calculating one of the correcting weights. The plurality of correcting weights are generated even when the other correcting weight is thus automatically determined by the normalization and by calculating one of the plurality of correcting weights.

Figure 7F:
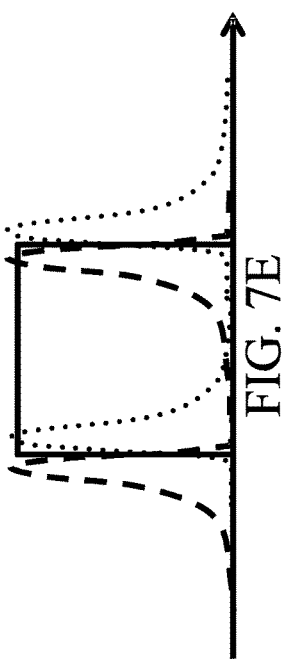

The above image processing using each parallax image illustrated in FIG. 7B can obtain a corrected image illustrated by the broken line in FIG. 7F. A method for generating a corrected image using a correcting weight calculated with Expression (5) is the same as that of the second embodiment.

As illustrated in FIGS. 7C and 7D, the corrected image generated by the image processing using the correcting weight that is generated based on the difference or reciprocal of the pixel value according to the first and second embodiments shifts from the ideal image in the image area having high pixel values. On the contrary, the corrected image generated by the image processing according to this embodiment using the correcting weight that is generated based on the pixel value and the pixel value gradient is closer to the ideal image, because the reciprocal of the pixel value gradient is introduced and the pixel value increases in the image area having high pixel values. Thereby, this embodiment can obtain a better aberration correcting effect than the first and second embodiments.

A direction for calculating a pixel value gradient in the parallax image or a direction for differentiating the pixel value is, for example, a sagittal direction in a target area in the parallax image. Nevertheless, the calculating direction of a pixel value gradient is not limited to the sagittal direction and may be any directions as long as the pixel value gradient can be calculated.

FIG. 13A illustrates direction (broken-line arrow directions) for differentiating a pixel value and a pair of parallax images (white and black images). The differentiating direction, as used herein, is a direction in which the PSF has a narrow spread in the pair of parallax images. FIG. 13C illustrates a one-dimensional distribution of the pixel value on the line along the broken-line arrow illustrated in FIG. 13A. In FIG. 13C, one broken line illustrates a pixel value distribution of each of the pair of parallax images. Since there is no difference in pixel value between the pair of parallax images in this distribution, there is no difference in pixel value gradient as the differential value. Hence, the aberration correcting effect does not improve even when the pixel value gradient is introduced.

FIG. 13B illustrates the same pair of parallax images as those in FIG. 13A and a differentiating direction (broken-line arrow direction) different from that in FIG. 13A. The differentiating direction, as used herein, means a direction in which the PSF has a wide spread in the pair of parallax images or a direction in which the difference of the PSF is large in the pair of parallax images. FIG. 13D illustrates a one-dimensional distribution of the pixel value on the line along a broken-line arrow illustrated in FIG. 13B. In FIG. 13D, broken and dotted lines illustrate pixel value distributions of the pair of parallax images. Since there is a large difference in pixel value between the pair of parallax images in this distribution, the pixel value gradient is large, and the aberration correcting effect significantly improves as a result of the pixel value gradient is introduced. Thus, the aberration correcting effect can be improved by selecting as the differentiating direction a direction in which the PSF has a wide spread (difference) in the pair of parallax images. Hence, a direction in which the PSF has a wide spread for each corresponding pixel in the pair of parallax images is prepared for optical information of the image capturing system, and the pixel value gradient at the corresponding pixel may be calculated in this direction.

The parameters g1 and g2 used to control the aberration correcting effect in Expression (5) are an index of the image pixel gradient ΔIMG and an index of a product between a reciprocal of a pixel value and the image pixel gradient ΔIMG, respectively. The parameter g2 corresponds to the parameter g in Expression (2). The parameters g1 and g2 have positive values and are typically set to g1=0.1 to 1 and g2=1 to 10.

Figure 14:
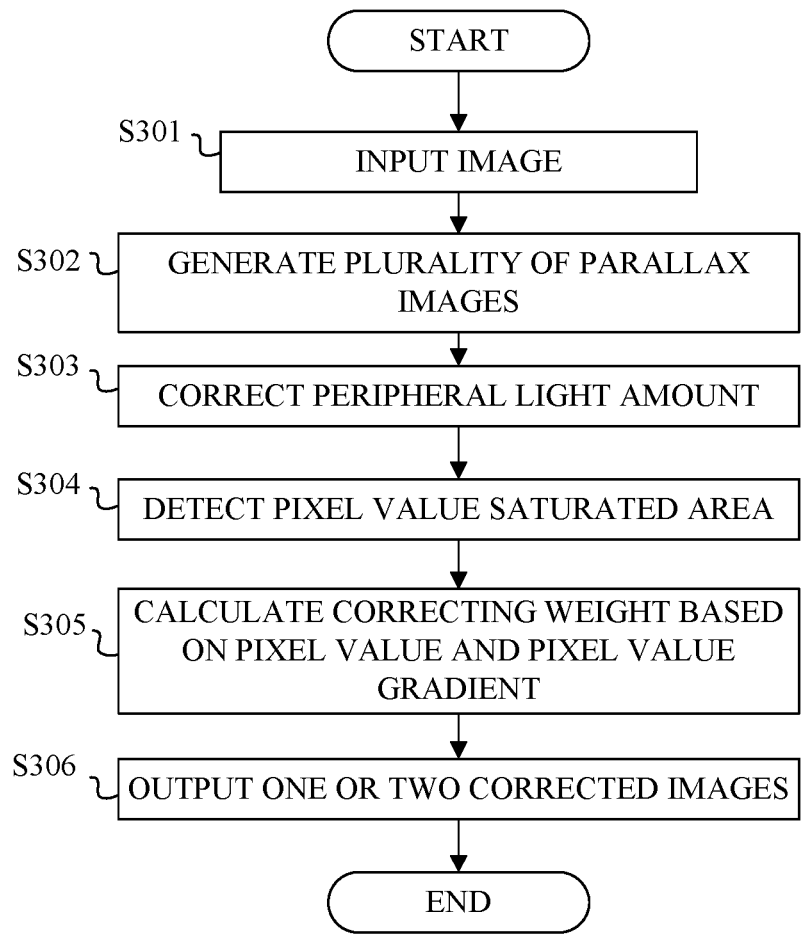
FIG. 14 is a flowchart illustrating a procedure of image processing according to the third embodiment.

Referring now to a flowchart in FIG. 14, a description will be given of a concrete procedure of the image processing according to this embodiment. Step S301 is the same as the step S201 in the second embodiment in FIG. 11, and a description thereof will be omitted.

In step S302, the image processor 104 reconstructs the input image generated based on the captured signal from the G1, G2, G3, and G4 pixel groups. Thereby, this embodiment generates four parallax images corresponding to the G1, G2, G3, and G4 pixel groups.

Since step S303 is the same as the step S203 in the second embodiment, a description thereof will be omitted.

In step S304, the image processor 104 detects a pixel value saturated area in each parallax image (each light quantity corrected parallax image generated in the step S303). At this time, the area that contains all saturated pixels detected by the respective parallax images will be referred to as pixel value saturated areas. The pixel value saturated area may contain a peripheral area having a predetermined size that encloses the detected saturated pixel.

In step S305, the image processor 104 reads out of the memory 108 information of the direction (PSF spreading direction) in which the PSF has a wide spread in the image capturing system corresponding to the four parallax images, as optical information of the image capturing system stored in the memory 108. Since the PSF spreading direction is different according to the image pickup condition, such as the focal length and the aperture value, and the position on the parallax image, the image processor 104 reads out of the storage 108 the PSF spreading direction corresponding to the image pickup condition for each position (corresponding pixel) on the parallax image.

Thereafter, the image processor 104 calculates (generates) the four correcting weights corresponding to the four parallax images with Expression (5) according to the pixel value, the pixel value gradient, and the PSF spreading direction in the four parallax images. The parameters g1 and g2 are set, for example, to g1=0.1 and g2=2.

Figure 15A:
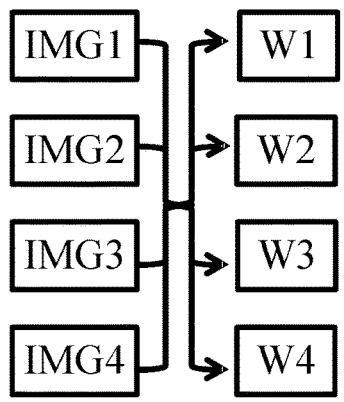
FIGS. 15A to 15D are views for explaining a using method of a plurality of parallax images and a plurality of correcting weights according to the third embodiment.

As illustrated in FIG. 15A, each correcting weight (W1 to W4) may be calculated based on all of the pixel values, the pixel value gradient, and the PSF spreading direction in the four parallax images IMG1 to IMG4. IMG1, IMG2, IMG3, and IMG4 are parallax images corresponding to the G1, G2, G3, and G4 pixel groups generated in the step S302. W1, W2, W3, and W4 are correcting weights corresponding to the parallax images IMG1, IMG2, IMG3, and IMG4. As illustrated in FIG. 15C, each correcting weight may be calculated using the pixel values, the pixel value gradient, and the PSF spreading direction in the two parallax images.

In step S306, the image processor 104 generates the corrected image by synthesizing (adding) to the pixel value of the pixel value saturated area in each parallax image the multiplication result of the parallax image by the corresponding correcting weight in the step S305.

Figure 15B:
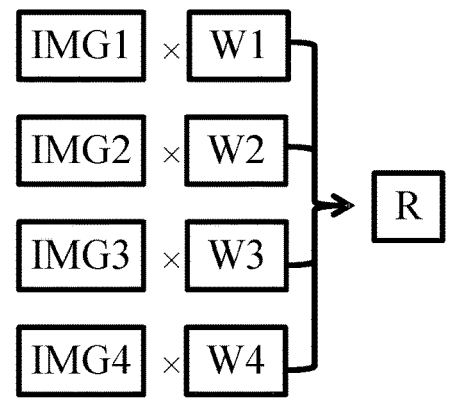
Figure 15C:
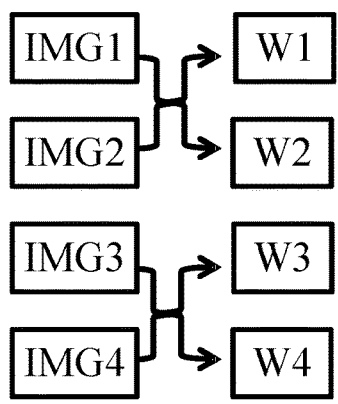

In calculating each correcting weight using the four parallax images in the step S305, four results obtained by multiplying the four parallax images IMG1 to IMG4 by corresponding correcting weights W1 to W4 as in FIG. 15B are summed up. Thereby, a single corrected image R is generated.

Figure 15D:
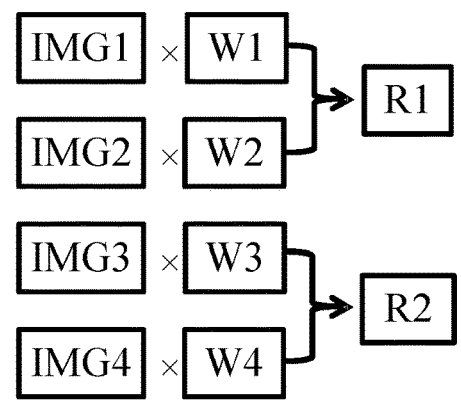

In calculating each correcting weight using the two parallax images in the step S305, a corrected image R1 is calculated by summing up two results obtained by multiplying two parallax images IMG1 and IMG2 by the corresponding correcting weights W1 and W2 as illustrated in FIG. 15D. A corrected image R2 is calculated by summing up two results obtained by multiplying the other two parallax images IMG3 and IMG4 by the corresponding correcting weights W3 and W4. These two corrected images R1 and R2 are images having parallaxes.

In the image area other than the pixel value saturated area, an average value of the pixel values of the corresponding pixels in four or two parallax images used to calculate the correcting weights is output as the pixel value of the corrected image. This embodiment thus corrects the aberration only in the pixel value saturated area.

The image recording medium 109 stores the one corrected image R or two corrected images R1 and R2 output from the image processor 104 under command of the system controller 107. The system controller 107 may store at least one of the input image and the four parallax images before the aberration is corrected, in the image recording medium 109. The system controller 107 may make the image display unit 105 display at least one of the input image and the four parallax images before the aberration is corrected.

The image processing according to this embodiment needs a convolution to calculate the pixel value gradient but the size of a filter (Kernel) used for this processing is as small as a 1×3 tap. Unlike the filtering processing disclosed in JP 2013-236207 that requires a convolution of a filter of dozens taps times dozens taps, the corrected image can be generated by fast and burdenless image processing.

The image processing according to this embodiment needs data only relating to a plurality of parallax images, a vignetting amount, and a PSF spreading direction. The PSF spreading direction changes according to the image pickup condition and the position on the image, and requires plural pieces of data by the number of changes. However, the data amount is small because the data is not related to the PSF itself but the PSF spreading direction. Hence, a necessary data amount can be smaller than that for the filtering processing in JP 2013-236207 that requires the PSF data for each image pickup condition and for each position on the image.

This embodiment calculates the correcting weight by considering the pixel value gradient, and can obtain a better aberration correcting effect in the output corrected image.

The image processing according to the second and third embodiments generates a corrected image by applying the correcting weight including a parameter for controlling the aberration correcting effect, to each parallax image. As described above, the correcting weights can be binarized into 1 and 2 by extremely increasing the parameter for controlling the aberration correcting effect. In that case, the image processing according to the second and third embodiments selects one of the parallax images for each pixel and uses the pixel value as a pixel value of a corrected image. In other words, the aberration correcting procedure according to the first embodiment is one example of the aberration correcting procedure according to the second and third embodiments.

The first to third embodiments can generate a corrected image in which the deterioration caused by the aberration is properly restrained, with the burdenless processing with a small data amount.

The first and third embodiments may execute the processing according to the second embodiment that applies the correcting weight to the in-focus area. The first embodiment may execute a correction of reducing a difference of a vignetting amount according to the second and third embodiments.

While the first to third embodiments describe a method for calculating a correcting weight based on the pixel value or pixel value gradient, the correcting weight may be calculated based on information on a position of an edge in each parallax image. For example, in the one-dimensional pixel value distribution in the pair of parallax images illustrated in FIG. 7B, the edge position of the object image is detected and the pixel values of the image area at both sides of the edge are compared with each other. A correcting weight may be calculated so that a correcting weight corresponding to a parallax image having a higher pixel value may have a larger value in an image area having a relatively high pixel value, and a correcting weight corresponding to a parallax image having a lower pixel value may have a larger value in an image area having a relatively low pixel value.

Fourth Embodiment

Figure 16:
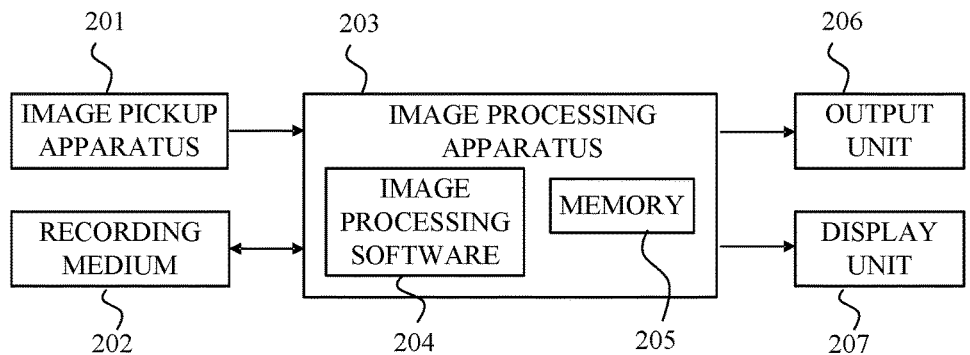
FIG. 16 is a block diagram illustrating a structure of an image processing apparatus according to a fourth embodiment.

FIG. 16 illustrates an image processing apparatus according to a fourth embodiment that can execute image processing according to the first to third embodiments.

An image processing apparatus 203 is made as a personal computer, and has image processing software 204 (image processing program) and a memory 205. The image processing apparatus 203 is connected to one or both of an image pickup apparatus 201 that provides a pupil division and a recording medium 202. The image processing apparatus 203 reads an input image out of the image pickup apparatus 201 or the recording medium 202, executes the image processing according to any one of the first to third embodiments in accordance with the image processing software 204, and generates a corrected image. The memory 205 corresponds to the memory 108 in the image pickup apparatus according to the first to third embodiments. While the first to third embodiments store optical information on a vignetting amount and a PSF spreading direction in the memory 108, this embodiment may provide the optical information to the input image as header information etc.

The image processing apparatus 203 may be connected to one or both of an output unit 206 and a display unit 207. The image processing apparatus 203 outputs one or more of the input image, a plurality of parallax images, and one corrected image or more to at least one of the output unit 206, the display unit 207, and the recording medium 202. The recording medium 202 includes, for example, a semiconductor memory, a hard disk drive, and a server on a network. The display unit 207 includes, for example, a liquid crystal display and a projector. The output unit 206 includes, for example, a printer.

Thus, even when a single image processing apparatus is used separately from the image pickup apparatus, burdenless processing with a small data amount can generate, based on a plurality of parallax images, a corrected image in which the deterioration caused by the aberration is sufficiently restrained.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-101879, filed May 19, 2015, which is hereby incorporated by reference herein in its entirety.

What is claimed is:

1. An image processing apparatus configured to generate a corrected image in which a deterioration caused by an aberration of an image capturing system is restrained, using a plurality of parallax images mutually having parallaxes generated by the image capturing system, the image processing apparatus comprising:
   at least one processor operatively coupled to a memory, serving as:
   (A) a weight generator configured to generate a plurality of weights as weighting data, each of which corresponds to one of the parallax images, based on one of pixel values and pixel value gradients of pixels at a same position in the plurality of parallax images; and
   (B) an image generator configured to generate the corrected image by summing up the pixel values at the same position in the plurality of parallax images using the plurality of weights, each of which corresponds to one of the parallax images.

2. The image processing apparatus according to claim 1, wherein the weight generator generates the plurality of weights such that a weight corresponding to a parallax image having a lower pixel value in the plurality of parallax images has a greater value.

3. The image processing apparatus according to claim 1, wherein the weight generator generates the plurality of weights such that a weight corresponding to a parallax image having a lesser pixel value gradient in the plurality of parallax images has a greater value.

4. The image processing apparatus according to claim 1, wherein the image generator detects an in-focus area in which the image capturing system is focused in the plurality of parallax images, and applies the weight to the in-focus area in each parallax image.

5. The image processing apparatus according to claim 1, wherein the image generator detects a saturated pixel in which a pixel value is saturated in the plurality of parallax images, and applies the weight to an area that contains the saturated pixel in each parallax image.

6. The image processing apparatus according to claim 1, wherein the at least one processor further comprises a peripheral light quantity corrector configured to generate a plurality of light quantity corrected parallax images by reducing a difference of a vignetting amount for the plurality of parallax images, wherein the weight generator generates the plurality of weights based on at least one of the pixel value and the pixel value gradient in the plurality of light quantity corrected parallax images, and the image generator applies the weight to a corresponding one of the plurality of light quantity corrected parallax images.

7. The image processing apparatus according to claim 1, wherein the weight includes a first weight component based on the pixel value, and a second weight component based on the pixel value gradient, and wherein the weight generator generates the plurality of weights such that the first weight component is heavier than the second weight component in an area having a lower pixel value in each parallax image, and the second weight component is heavier than the first weight component in an area having a higher pixel value in each parallax image.

8. The image processing apparatus according to claim 1, wherein the image generator generates a single image or a plurality of images mutually having parallaxes as the corrected image.

9. The image processing apparatus according to claim 1, wherein the plurality of parallax images are generated by photoelectrically converting a plurality of light fluxes from areas different from each other in an exit pupil in an image pickup optical system, using photoelectric converters different from each other in an image sensor.

10. An image pickup apparatus configured to generate a plurality of parallax images mutually having parallaxes using an image capturing system, the image pickup apparatus comprising an image processing apparatus configured to generate a corrected image in which a deterioration caused by an aberration of the image capturing system is restrained, using the plurality of parallax images, wherein the image processing apparatus includes at least one processor operatively coupled to a memory serving as:
(A) a weight generator configured to generate a plurality of weights as weighting data, each of which corresponds to one of the parallax images, based on one of pixel values and pixel value gradients of pixels at a same position in the plurality of parallax images; and
(B) an image generator configured to generate the corrected image by summing up the pixel values at the same position in the plurality of parallax images using the plurality of weights, each of which corresponds to one of the parallax images.

11. An image processing method configured to generate a corrected image in which a deterioration caused by an aberration of an image capturing system is restrained, using a plurality of parallax images mutually having parallaxes generated by the image capturing system, the image processing method comprising the steps of:

generating a plurality of weights as weighting data each of which corresponds to one of the parallax images, based on one of pixel values and pixel value gradients of pixels at a same position in the plurality of parallax images; and generating the corrected image by summing up the pixel values at the same position in the plurality of parallax images using the plurality of weights, each of which corresponds to one of the parallax images.

12. A non-transitory computer-readable storage medium for storing a computer program configured to enable a computer to execute image processing configured to generate a corrected image in which a deterioration caused by an aberration of an image capturing system is restrained, using a plurality of parallax images mutually having parallaxes generated by the image capturing system, the image processing comprising the steps of:

generating a plurality of weights as weighting data each of which corresponds to one of the parallax images, based on one of pixel values and pixel value gradients of pixels at a same position in the plurality of parallax images; and generating the corrected image by summing up the pixel values at the same position in the plurality of parallax images using the plurality of weights, each of which corresponds to one of the parallax images.

* * * * *